(12) United States Patent
Abdelmonem et al.

(10) Patent No.: US 6,622,028 B1
(45) Date of Patent: Sep. 16, 2003

(54) RECEIVER FRONT-END HAVING A HIGH-TEMPERATURE SUPERCONDUCTING FILTER AND A BYPASS PATH

(75) Inventors: Amr Abdelmonem, Arlington Heights, IL (US); Leo Nadel, Lake Zurich, IL (US); John Logeman, Park Ridge, IL (US)

(73) Assignee: ISCO International, Inc., Mount Prospect, IL (US)

( * ) Notice: Subject to any disclaimer, the term of this patent is extended or adjusted under 35 U.S.C. 154(b) by 0 days.

(21) Appl. No.: 09/552,295

(22) Filed: Apr. 19, 2000

(51) Int. Cl.[7] .............................. H04B 1/38; H03F 3/04; H04M 1/00

(52) U.S. Cl. .................... 455/561; 455/117; 455/334; 343/890; 330/289

(58) Field of Search ................................. 455/561, 117, 455/217, 103, 128, 129, 66, 280, 282, 562, 188; 343/890; 333/99 R; 330/289, 207; 62/51.1, 259.2, 331

(56) References Cited

U.S. PATENT DOCUMENTS

| | | | | |
|---|---|---|---|---|
| 3,744,467 A | * | 7/1973 | Wagner | 123/179.3 |
| 5,023,939 A | * | 6/1991 | Hori | 455/188.1 |
| 5,787,713 A | * | 8/1998 | Russo | 62/259.2 |
| 5,835,853 A | * | 11/1998 | Enoki et al. | 455/180.1 |
| 6,097,181 A | * | 8/2000 | Russo | 323/360 |
| 6,104,934 A | * | 8/2000 | Patton et al. | 455/117 |
| 6,367,266 B1 | * | 4/2002 | Kobayashi et al. | 343/720 |
| 6,424,135 B1 | * | 7/2002 | Russo | 323/360 |

OTHER PUBLICATIONS

Press Release: "Illinois Superconductor's SpectrumMaster Named 'Top Product' of 1996" (Jan. 10, 1997).
Press Release: "Illinois Superconductor Corporation Announces Results of Initial PCS Product Tesing—Company Also Receives Orders From New Customer" (Feb. 18, 1997).
Press Release: "Illinois Superconductor Corporation Unveils Advanced PCS Base Station Front End at CTIA's Wireless '97 in San Francisco" (Mar. 3, 1997).
Press Release: "Illinois Superconductor Corporation Demonstrates New Cellular Base Station Receiver Front End at CTIA's Wireless '97" (Mar. 4, 1997).
Press Release: "Illinois Superconductor Reports Results for 1996—Announces Completion of First RangeMaster™ Field Trials" (Mar. 18, 1997).
Press Release: "Illinois Superconductor Introduces Two New Product Lines and Additions to Existing Product Lines" (Feb. 23, 1998).
Press Release: "Illinois Superconductor Completes Installation of 15 RangeMaster© Systems for Southwestern Bell Mobile Systems" (Aug. 17, 1998).
Press Release: "Illinois Superconductor Corporation Announces New Customer—Ramcell Cellular Outfits 3 Cell Sites With RangeMaster® Equipment" (Aug. 26, 1998).

(List continued on next page.)

*Primary Examiner*—Dwayne Bost
*Assistant Examiner*—Kamran Afshar
(74) *Attorney, Agent, or Firm*—Marshall, Gerstein & Borun (57) ABSTRACT

An RF system includes a cryostat having a chamber and a cold region in the chamber, a high-temperature superconducting filter disposed in the cold area, a low-noise amplifier disposed in the chamber, a bypass switch coupling the high-temperature superconducting filter to the low-noise amplifier, and a conventional filter coupled to the bypass switch.

17 Claims, 6 Drawing Sheets

OTHER PUBLICATIONS

Press Release: "Illinois Superconductor Announces New Customer–Highland Cellular Outfits Six Cell Sites With RangeMaster© Equipment" (Nov. 17, 1998).

Press Release: "Illinois Superconductor Announces New GSM Filter Line—Field Test Scheduled with Major OEM" (May 5, 1999).

Press Release: "Illinois Superconductor Announces Dramatic Results from CDMA Installation—Anticipate Increased Revenues to Result" (May 20, 1999).

Press Release: "Illinois Superconductor Announces 70% Capacity Improvement For CDMA Systems—Addresses Pressing Operator Needs as Cellular Demands Soar" (May 27, 1999).

Press Release: "Illinois Superconductor Announces Test Agreements with Third Generation Cellular OEMS—Positions Company as Premier 3G CDMA Filter Supplier" (Jun. 16, 1999).

Press Release: "Illinois Superconductor Announces Successful Results with TDMA Installations—Increased Cell Site Revenues Expected to Exceed Product Cost in Less than Three Months" (Aug. 19, 1999).

Press Release: "Illinois Superconductor Announces Test Agreement with Additional Third Generation System Supplier" (Aug. 24, 1999).

Rolfes, Marc, "Reducing the effect of RF Interference," *Mobile Radio Technology,* (Sep. 1995).

* cited by examiner

RECEIVER FRONT-END HAVING A HIGH-TEMPERATURE SUPERCONDUCTING FILTER AND A BYPASS PATH

FIELD OF THE INVENTION

The present invention relates generally to radio-frequency (RF) communication systems and, more particularly, to such systems having a high-temperature superconducting (HTS) filter.

BACKGROUND OF THE INVENTION

Radio frequency (RF) filters have been used with cellular base stations and other telecommunications equipment for some time. Such filters are conventionally used in a receiver front-end to filter out noise and other unwanted signals that would harm components of the receiver in the base station. For example, bandpass filters are conventionally used to filter out or block RF signals in all but one or more predefined bands. With the recent dramatic rise in wireless communications, such filtering should provide high degrees of both selectivity (the ability to distinguish between signals separated by small frequency differences) and sensitivity (the ability to receive weak signals) in an increasingly hostile frequency spectrum.

The relatively recent advancements in superconducting technology have given rise to a new type of RF filter, namely, the high-temperature superconducting (HTS) filter. HTS filters contain components which are superconductors at or above the liquid nitrogen temperature of 77 K. Such filters provide greatly enhanced performance in terms of both sensitivity and selectability as compared to conventional filters. However, since known HTS materials are only superconductive at relatively low temperatures (e.g., approximately 90 K or lower), and are relatively poor conductors at ambient temperatures, such superconducting filters require accompanying cooling systems to ensure the filters are maintained at the proper temperature during use.

The cooling system typically includes a cryorefrigerator, which, in turn, has a compressor for maintaining a supply of pressurized coolant and a heat exchanger or cold head to remove heat from the devices being cooled. In addition, the cooling system must minimize the amount of heat transfer from the environment by enclosing the HTS filter and other cooled devices in a cryostat. The cryostat is then often evacuated of any gaseous material to reduce convection heating.

With the aforementioned dependency on a cooling system, the reliability of traditional HTS-based receiver front-ends has been tied to the reliability of the power source. Specifically, if the power source (e.g., a commercial power distribution system) fails (e.g., a black out, a brown out, etc.) for any substantial length of time, the cooling system would likewise fail and, when the corresponding HTS components warm sufficiently to prevent superconduction, so too would the filters.

To prevent systems serviced by such filters from failing during these power outages, additional circuitry in the form of RF bypass circuitry has been used to switch out the failed filter until a suitably cooled environment was returned.

Figure 1:
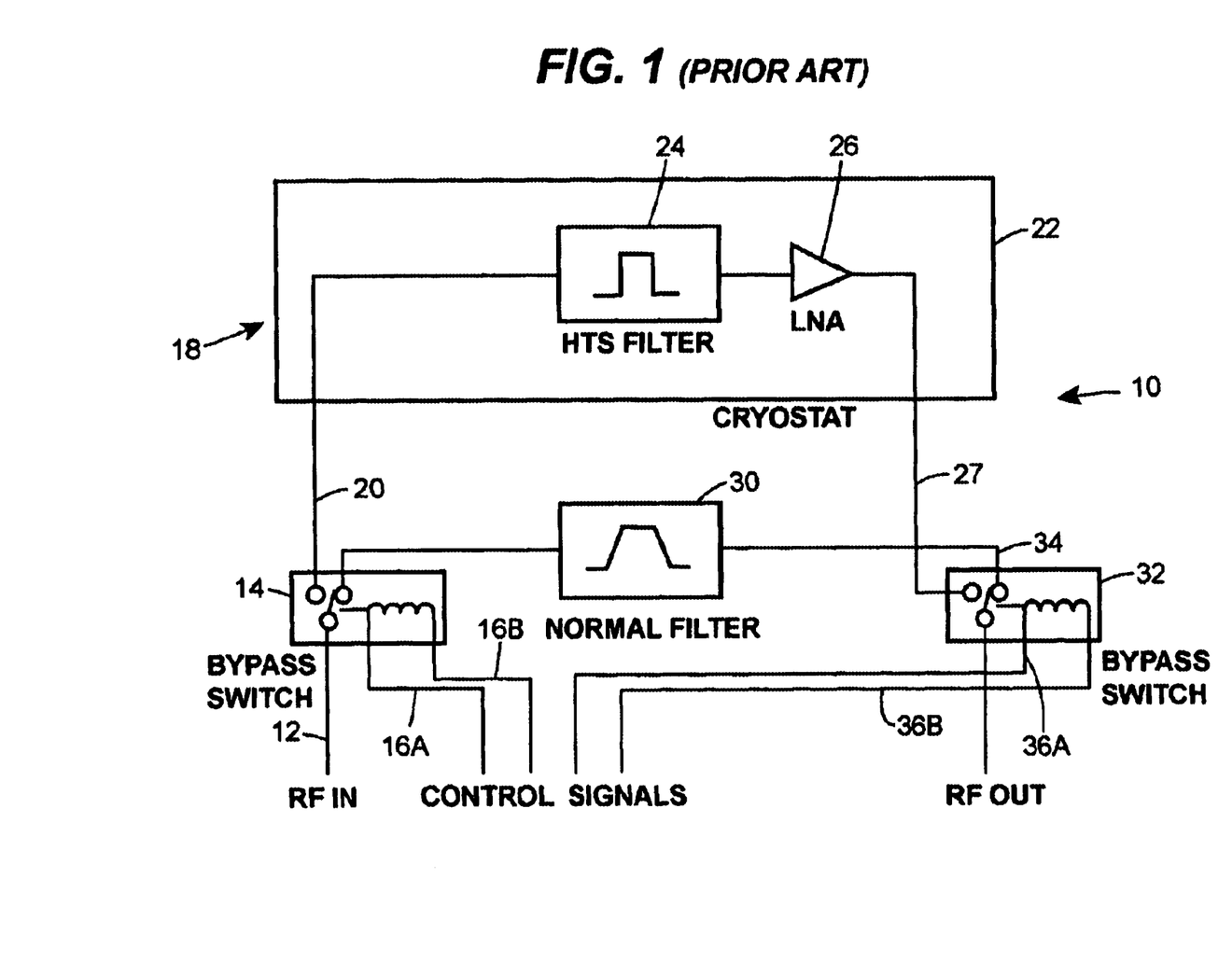
FIG. 1 is a block diagram of a prior art receiver front-end.

As shown in FIG. 1, in a typical HTS front-end receiver indicated generally at 10, an incoming RF signal collected by an antenna (not shown) is provided via low-loss cabling 12 to a bypass switch 14 to determine whether the RF signal will be filtered via an HTS path or a conventional path. The state of the bypass switch 14 is controlled by a control signal carried by lines 16A and 16B that may be developed by a controller (not shown) associated with the receiver that monitors the performance of a cooling system indicated generally at 18. If the cooling system 18 is performing adequately, the RF signal is passed via low-loss cabling 20 to a cryostat 22 housing the components of the HTS path. The cryostat 22 includes a port (not shown) and a coupling mechanism (not shown) for connecting the cabling 20 to an HTS filter 24 disposed inside the cryostat 22. Typically, the port and the coupling mechanism are designed to ensure both a good vacuum seal and minimal heat conduction.

The HTS filter 24 then removes signal components outside of the passband, i.e., the frequency range of the desired signal. Because the resulting filtered signal is usually very weak, the HTS filter 24 is coupled to an amplifier 26 that does not introduce a significant amount of noise (i.e., a low-noise amplifier or LNA). The amplified signal is then passed through another port (not shown) in the cryostat 22 as an output signal for the HTS path on cabling 27.

If the cooling system 18 is not functioning or otherwise not performing adequately, the bypass switch 14 provides the incoming RF signal to a conventional (i.e., non-HTS) filter 30 designed to remove signal components outside of the same passband as that of the HTS filter 24. A further bypass switch 32 determines whether the output signal on the cabling 27 or the filtered signal carried by cabling 34 coupled to the conventional filter 30 should be passed on to the remainder of the communication station. The bypass switch 32 may be controlled by a control signal provided thereto by lines 36A and 36B.

In some base stations, the bypass path has included a short-circuit between the bypass switches 14 and 32 rather than the conventional filter 30. This type of configuration has been used for installations of HTS equipment in connection with the enhancement of preexisting networks, in which case the HTS path is added onto a receiver front-end without modifying or removing a downstream conventional filter-amplifier pair.

In the event of a cooling system failure, either of the above-described bypass systems results in the need for an additional amplifier (not shown), inasmuch as the amplifier 26 disposed in the cryostat 22 is bypassed as well. Such additional circuitry adds expense and complexity to known systems.

The assignee of the present application has developed an all-temperature performance (ATP™) filter capable of both cryogenic and non-cryogenic operation. Such filters are described in commonly assigned U.S. application Ser. No. 09/158,631, and operate as a high-performance superconducting filter system when cold, and revert to the performance of a conventional filter when warm, thereby eliminating the need for a separate bypass path. However, such filters utilize thick-film technology that may not be suitable for every receiver front-end installation or certain other applications.

SUMMARY OF THE INVENTION

In accordance with one aspect of the present invention, an RF system includes a cryostat, a high-temperature superconducting filter disposed in a cold area of a chamber of the cryostat, a low-noise amplifier disposed in the chamber of the cryostat, a bypass switch coupling the high-temperature superconducting filter to the low-noise amplifier, and a conventional filter coupled to the bypass switch.

In a preferred embodiment, the low-noise amplifier is disposed in the cold region. The bypass switch may be disposed in the chamber, and the RF system may further include a further low-noise amplifier that couples the conventional filter to the bypass switch.

The chamber of the cryostat may include a warm region in which the conventional filter is disposed. The RF system preferably includes a further bypass switch coupled to the high-temperature superconducting filter and the conventional filter.

In another preferred embodiment, the bypass switch includes a mechanism for switching based on temperature, such as a bi-metallic structure.

In accordance with another aspect of the present invention, an RF system includes a conventional filter, a first low-noise amplifier coupled to the conventional filter, a cryostat, a high-temperature superconducting filter disposed in a cold region of a chamber of the cryostat, a second low-noise amplifier disposed in the chamber and coupled to the high-temperature superconducting filter, and a bypass switch having a pair of input terminals coupled to the first and second low-noise amplifiers.

The first low-noise amplifier may be disposed in the chamber of the cryostat, or in the cold region of the cryostat chamber. Similarly, the bypass switch may be disposed in the chamber, or in the cold region of the chamber.

Other features and advantages are inherent in the RF systems claimed and disclosed or will become apparent to those skilled in the art from the following detailed description in conjunction with the accompanying drawings.

DETAILED DESCRIPTION OF PREFERRED EMBODIMENTS

The present invention is generally directed to receiver front-end configurations that provide both an HTS path and a bypass path for incoming RF signals. Each configuration may, but need not be, incorporated into wireless communication stations, such as a base station for a cellular, PCS (personal communications systems), or other wireless system. Both paths preferably include both filtering and amplification functionality to avoid the need for amplifier circuitry between the receiver front-end and the remainder of the receiver.

Some or all of the components of each receiver front-end configuration described herein may be housed in a cabinet (not shown) having suitable input and output ports (not shown) for connection to the remaining components of the receiver. The cabinet may also include components other than those dedicated to the receiver front-end, such as a transmit filter and one or more signal sensing systems for monitoring system performance, and may further include redundant systems for establishing multiple signal paths. The receiver front-end may also be incorporated into a duplexer configuration in which components in the transmit path are packaged and/or shared with those components in the receive path. It should also be noted that one or more antennae (that may or may not be omni-directional as is known to those skilled in the art) may be associated with the receiver front-end for coverage of a multiple-sector cell. For simplicity in description only, the present invention will be set forth in a receive-only, single cell or sector environment with the understanding that certain components, aspects, or elements described hereinbelow may need to be replicated, combined or otherwise modified for operation in a transceiver, multiple-sector, or other environment.

Figure 2:
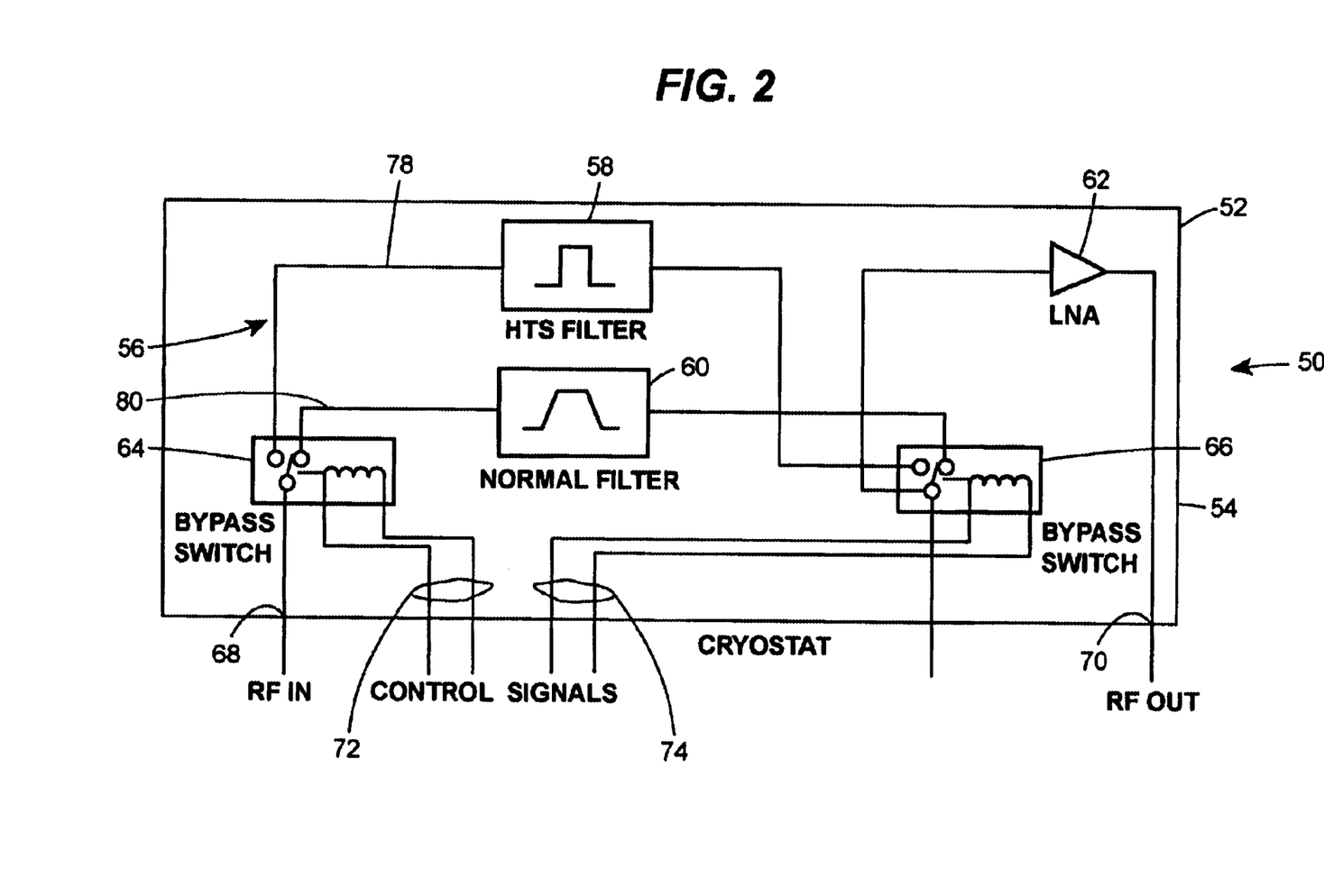
FIG. 2 is a block diagram of a receiver front-end in accordance with a first embodiment of the present invention.

Referring to FIG. 2, a receiver front-end indicated generally at 50 includes a cryostat 52 for maintaining a cryogenic environment for certain components disposed therein. The cryostat 52 may be a thin-walled cryostat, such as the device disclosed in co-pending and commonly assigned U.S. patent application Ser. No. 08/831,175, the disclosure of which is hereby incorporated by reference, or any other cryostat suitable for establishing a constant temperature and low pressure environment. To this end, the cryostat 52 includes a housing 54 coupled to a cryorefrigerator (not shown) by piping or hoses that carry a cooling fluid. The cryostat housing 54, in turn, defines a chamber 56 having a cold region and a warm region. The cold region generally corresponds with those portions of the chamber 56 that are in communication with a cold head (not shown). As will be appreciated by those skilled in the art, two structures may be "in communication" in a temperature sense regardless of whether they are, in fact, in contact. The cold head may have a cold finger (not shown) in contact with the components that need to be maintained at a certain cryogenic temperature. The cold head and the components cooled thereby may also be enclosed in insulation, such as multi-layer insulation (MLI) having thin layers of aluminum and a plastic, insulating layer. These layers may be wrapped around the cold head and the cooled components to minimize any heat transfer due to radiation.

Various cryostats are suitable for practice of the present invention, and the invention is not limited to any particular geometry for the cryostat, cold head, or cold finger, although certain size and shape considerations may need to be taken into account for interfacing with certain types of filters. The cryostat 52 may, for example, have a housing with cylindrical sides and domed ends. Because the cryostat 52, the chamber 56, or some portion thereof, may be substantially evacuated to minimize convection heating, other types of arch-shaped walls may be utilized to minimize strain on the cryostat housing 54, which may be composed of several materials known to those skilled in the art. The cryostat housing 54 preferably is composed of a material, such as certain stainless steel, that can withstand the pressure differences between the chamber 56 and the ambient environment.

Electrical and other connections passing through the cryostat housing 54 may take a variety of forms, but the coupling structures preferably provide a good vacuum seal as well as minimal heat conduction.

With continued reference to FIG. 2, and in accordance with one embodiment of the present invention, the cold region of the cryostat 52 preferably contains several cryogenic components, including an HTS filter 58, a conventional filter 60, a low-noise amplifier 62, and a pair of bypass switches 64 and 66. The bypass switch 64 is coupled to an input port 68 to receive an RF communication signal collected by the antenna (not shown). The input port 68, as well as any other such input/output ports described herein, may have the structure and characteristics as those coupling mechanisms described hereinabove and known to those skilled in the art. The filters 58 and 60 are generally designed to protect the low-noise amplifier 62 from signals collected by the antenna outside of a passband of interest to the receiver and/or the wireless communication system. The low-noise amplifier 62, in turn, is designed to strengthen signals at frequencies within the passband of the filters 58 and 60 without adding any significant noise, thereby essentially capturing or establishing the noise figure for the receive front-end 50. The filtered and amplified communication signal developed by the filters 58 or 60 and the low-noise amplifier 62 may then be supplied to an output port 70 for communication with the remainder of the receiver.

The bypass switches 64 and 66 determine whether the output of the receiver front-end 50 will follow an HTS path having the HTS filter 58 or a bypass path having the conventional filter 60. Accordingly, the bypass switches 64 and 66 preferably reside in one of two states. The state of each bypass switch 64 and 66 may be, in turn, determined by a pair of control signals carried by lines, wires, or other suitable cabling 72 and 74, respectively. For example, the bypass switches 64 and 66 may include a relay having a coil coupled to the lines 72 and 74, respectively, for opening or closing a single-pole, double-throw switch. The bypass switches 64 and 66 may share a single coil, as well as take any number of different configurations that provide low-loss, non-reflective switching at the frequencies of interest. Thus, the bypass switches 64 and 66 need not include a relay or other electromechanical actuator, but rather may include GaAs or other semiconductor circuitry having transistor-based or other switching capability.

Alternatively, the bypass switches 64 and 66 need not be driven by control signals, thereby removing the need for a controller monitoring the performance of the cooling system and/or the conditions within the cold region of the cryostat 52. In such embodiments, the bypass switches 64 and 66 include a bimetallic or other structure that is responsive to temperature for opening and closing a switch. Such devices are well known to those skilled in the art and accordingly will not be further described herein. In operation, as the temperature inside the cold region fluctuates across a predetermined threshold, those components of the bypass switches 64 and 66 may expand and/or contract in a relative fashion to open or close the switch, and thereby redirect the RF communication signal. The switches 64 and 66 may alternatively utilize circuitry or other structures having HTS components to rely upon the loss of superconductivity in a portion or all of the structure to change the state of the switch. For example, such a circuit may utilize a thin-film HTS strip within a transistor circuit that toggles between states depending upon whether the HTS strip is superconducting.

Each path may further include other components necessary for proper filtering of the RF signals, such as an equalizer (not shown). More particularly, in some embodiments of the present invention, an equalizer may be included to compensate for variances in group delay introduced by the HTS filter 58 within the passband. Equalization may be desirable when the aforementioned HTS path is utilized in connection with certain wide bandwidth communication systems, such as W-CDMA. The equalizer may include components such as those described in a co-pending and commonly assigned U.S. application filed on Feb. 28, 2000, entitled "Delay Equalization in Wireless Communications Systems Having a Highly Selective Filter," the disclosure of which is hereby incorporated by reference.

Each filter 58 and 60 may, in fact, be a filter system having multiple filters (not shown) that are cascaded to provide higher degrees of rejection. The cascaded filters may be separated by an isolator or other buffer, or an amplifier as described in co-pending, commonly assigned U.S. patent application Ser. No. 09/130,274, the disclosure of which is hereby incorporated by reference. Regardless of the particular configuration, the filter (or filters) 58 is an HTS-based filter, in the sense that the filter 58 includes resonator or other components having an HTS material. The filter 58 further preferably includes multiple resonant cavities that utilize HTS materials to provide excellent rejection while maintaining an extremely low insertion loss. More particularly, such HTS filters may include one or more components having a thick film coating of an HTS material. Suitable HTS filters are available from Illinois Superconductor Corporation (Mt. Prospect, Ill.) for a number of cellular and PCS bands. Such HTS filters include multiple split-ring, toroidal resonators that may be manufactured, mounted in resonant cavities, and tunable in accordance with the teachings of co-pending and commonly assigned U.S. patent applications Ser. Nos. 08/869,399, and 08/556,371, and U.S. Pat. Nos. 5,731,269, 5,789,347, and 5,843,871, the disclosures of all of which are hereby incorporated by reference.

It should be noted that the filter 58 need not include thick-film resonators, or cavity-based resonators, but may be based on a thin-film superconducting material deposited on a suitable substrate that may or may not be disposed in a resonant cavity.

Regardless of whether thick or thin film HTS materials are utilized, the HTS filter 58 is preferably a highly selective filter (as described hereinbelow) having an additive noise contribution of about 1 dB or less, more preferably about 0.7 dB or less, and most preferably about 0.5 dB or less. It shall be noted that the foregoing noise figures are, of course, temperature-dependent and, therefore, may need to be adjusted therefor.

The conventional filter 60 may be any type of non-HTS, bandpass filter suitable for selection of the same passband as the HTS filter 58. The filter 60, however, may be an equally or even more selective filter than certain HTS filters to provide high rejection, and may further be selected based on whether insertion losses are lowered through operation at cryogenic temperatures (as shown in FIG. 2). For example, those skilled in the art are readily aware of non-superconducting filters that provide improved responses when operating in a cryogenic environment, as well as filters containing components made of certain non-superconducting ceramics that have low-noise floors.

Regardless of the component materials, the filters 58 and 60 may be a highly selective filter (or alternatively a filter having a high selectivity) in the sense that the filter constitutes any ten or more pole filter for a bandwidth of about 1% or more (typically for full or whole band systems), or any filter having five or more poles for a bandwidth of about 0.3% or less (typically for channel-specific systems). More preferably, the filters 58 and 60 have twelve or more poles for a bandwidth of about 1% or more, while the filters 58 and 60 have six or more poles for a bandwidth of about 0.3% or less. Most preferably, the filters 58 and 60 have 16 or more poles for a bandwidth of about 1% or more, while the filters 58 and 60 have eight or more poles for a bandwidth of about 0.3% or less.

The filters 58 and 60 are coupled to other components within the cryostat 52 via respective 50 Ohm or other impedance coaxial cabling, or other suitable transmission lines known to those skilled in the art. To avoid reflection, and, therefore, signal loss, the transmission line should be impedance-matched to the components in question.

The low-noise amplifier 62 outputs a filtered, amplified RF signal having a fixed amount of gain over a frequency range set to correspond with the passband of the filters 58 and 60. For example, the low-noise amplifier 62 may provide about 25 dB of gain over the frequency range 1850 to 1910 MHZ with a maximum noise figure of about 1.2 dB (at room temperature). The low-noise amplifier 62 is preferably a GaAs-based amplifier to allow for operation at cryogenic temperatures. Such a low-noise amplifier is available from JCA Technology (Camarillo, Calif.) as product number JC12-2342D. Alternatively, the low-noise amplifier 62 provides similar gain levels over a lower frequency range (824 to 849 MHZ). Such a low-noise amplifier is available from JCA Technology as product number JCA01-3149.

In operation, the RF signal provided to the bypass switch 64 is passed to one of two switch contacts or terminals for delivery via cabling 78 or 80 to either the HTS filter 58 or the conventional filter 60, respectively, depending on the state of the switch 64. The RF signal is then filtered by either the HTS filter 58 or the conventional filter 60, as described hereinabove and passed via cabling and perhaps other components (as described hereinabove) to the bypass switch 66. The bypass switch 66 may, but need not, be identical to the bypass switch 64, such that the filtered signal is provided to one of two contacts or terminals that is currently in communication with the low-noise amplifier 62 depending on the state of the switch 66 and via suitable cabling. The amplified signal developed by the low-noise amplifier 62 is then provided via suitable cabling to the output port 70.

The embodiment shown and described in connection with FIG. 2 is configured such that the low-noise amplifier 62 is disposed in the chamber 56 of the cryostat 52, as well as the cold region developed by the cold head, and still further is part of both the HTS and bypass paths. Both of the bypass switches 64 and 66 are also disposed in the cold region of the chamber 56 of the cryostat 62 for cryogenic operation. The bypass switches 64 and 66 may be of a latching-type such that power is consumed only during switching, thereby minimizing the heat generated by the switches in the cold region. The heat loading is further minimized in the embodiment of FIG. 2 because only two heat leaks are presented by RF cable interfaces (see ports 68 and 70). As a result of the foregoing, the receiver front-end 50 may have minimal heat loading from cabling despite the structure associated with the switches being held at cryogenic temperatures.

Alternatively, any portion of the bypass switches 62 and 64 (and/or the actuating mechanism therefor) may be disposed in a warm region of the cryostat 62, in the sense that the cold finger will not be in communication therewith for cooling. In such cases, the switches 64 and 66 may include low-heat conduction mechanical links to the switch contacts.

Figure 3:
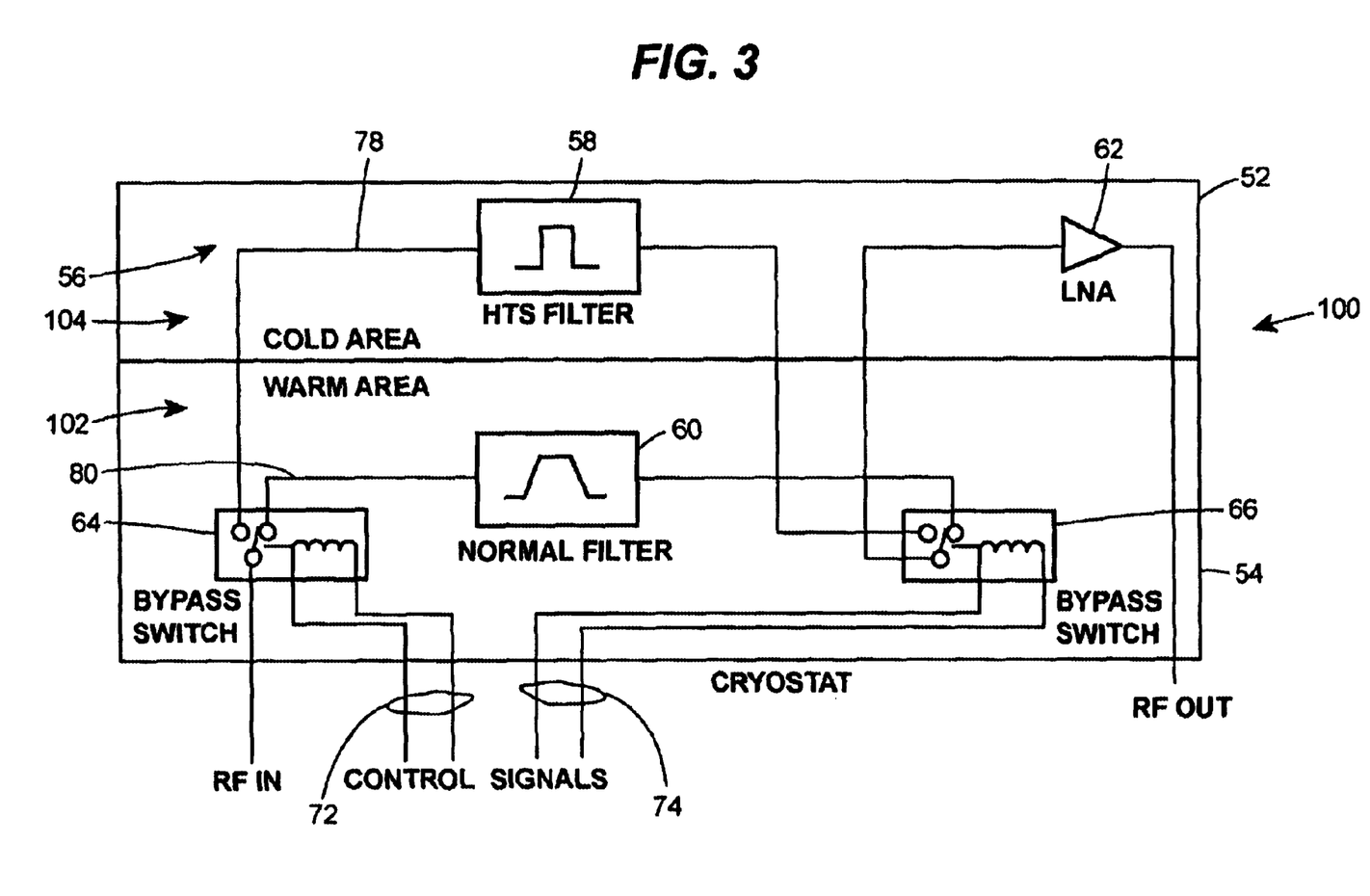
FIG. 3 is a block diagram of a receiver front-end in accordance with a second embodiment of the present invention.

With reference now to FIG. 3, where like elements from earlier figures are identified by like reference numerals, a receiver front-end 100 includes similar components to the embodiment shown and described in connection with FIG. 2, but differing therefrom as certain components are disposed within the cryostat chamber 56, but within a warm (i.e., non-cryogenic temperatures not suited for high-temperature superconduction) region 102 thereof. The warm region 102 corresponds with those portions of the components disposed in the cryostat chamber 56 not in communication with the cold finger and not within the aforementioned insulation (not shown). The cryostat chamber 56 shown in FIG. 3 also includes a cold region 104 (developed as described hereinabove) for certain other components, such as the HTS filter 58 and the low-noise amplifier 62. Because the conventional filter 60 and the bypass switches 64 and 66 are mounted in the warm region 102, the heat transfer from the two RF cables is about twice the heat transfer from the switch control signal wires in the embodiment of FIG. 2.

Because the switches 64 and 66 need not operate in a cryogenic environment, the switches 64 and 66 need not be of the latching type, thereby potentially lowering expenses and decreasing complications.

The heat loading in the embodiment of FIG. 3 may approximate that of the embodiment of FIG. 2 despite the fact that four (rather than two) RF cables provide the possibility for heat leaks into the cold region of the cryostat chamber. This rough equivalence may be due to the heat leak associated with the switch control signal wiring of the embodiment of FIG. 2, which is of the same order of magnitude as the heat leak provided an additional RF cables.

Figure 4:
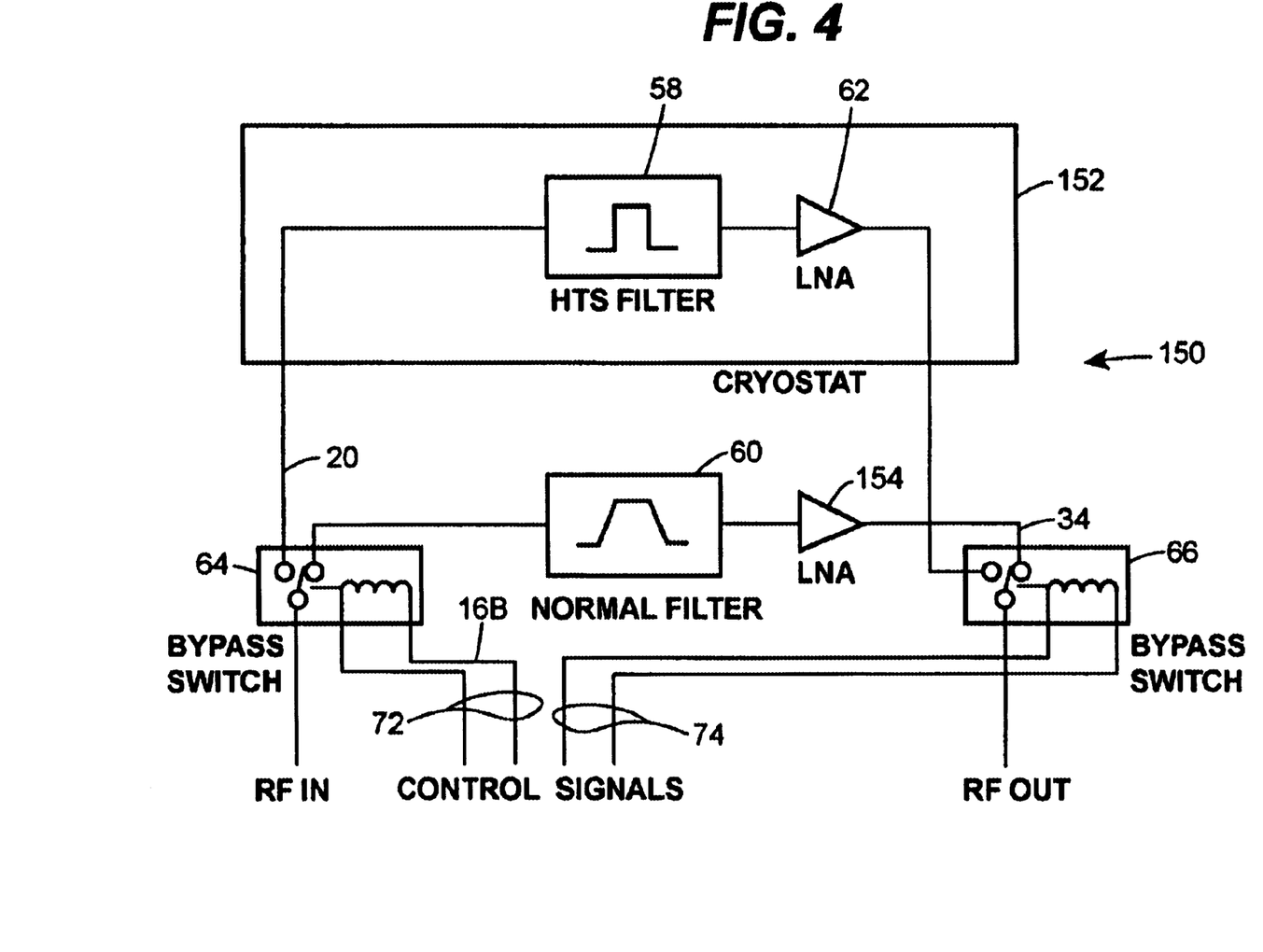
FIG. 4 is a block diagram of a receiver front-end in accordance with a third embodiment of the present invention.

With reference now to FIG. 4, where like elements have been identified by like reference numerals, a receiver front-end 150 includes many of the same components of the foregoing embodiments, however, with the components of the bypass path outside of a cryostat 152, which may be different in size, shape, complexity, and structure due to the difference in components housed therein, as will be appreciated by those skilled in the art. Both of the bypass switches 64 and 66 also reside outside of the cryostat 152, and therefore, the bypass switches 64 and 66 need not be of the low-power, latching variety described hereinabove.

The embodiment of FIG. 4 differs substantially from the foregoing embodiments in that an additional low-noise amplifier 154 is coupled to the conventional filter 60 such that the bypass path need not rely upon the low-noise amplifier 62 in the HTS path, which may experience performance problems during failure of the cooling system.

A further advantage of the embodiment of FIG. 4 regards the ability to adjust the respective gains of the two paths, i.e., the two amplifiers 62 and 154, such that no downstream adjustment is necessary. In other words, regardless of whether the cooling system has failed, the output of the receiver front-end 150 will be the same. The prior embodiments may have had to rely upon additional components providing imprecise attenuation to achieve a similar result.

Figure 5:
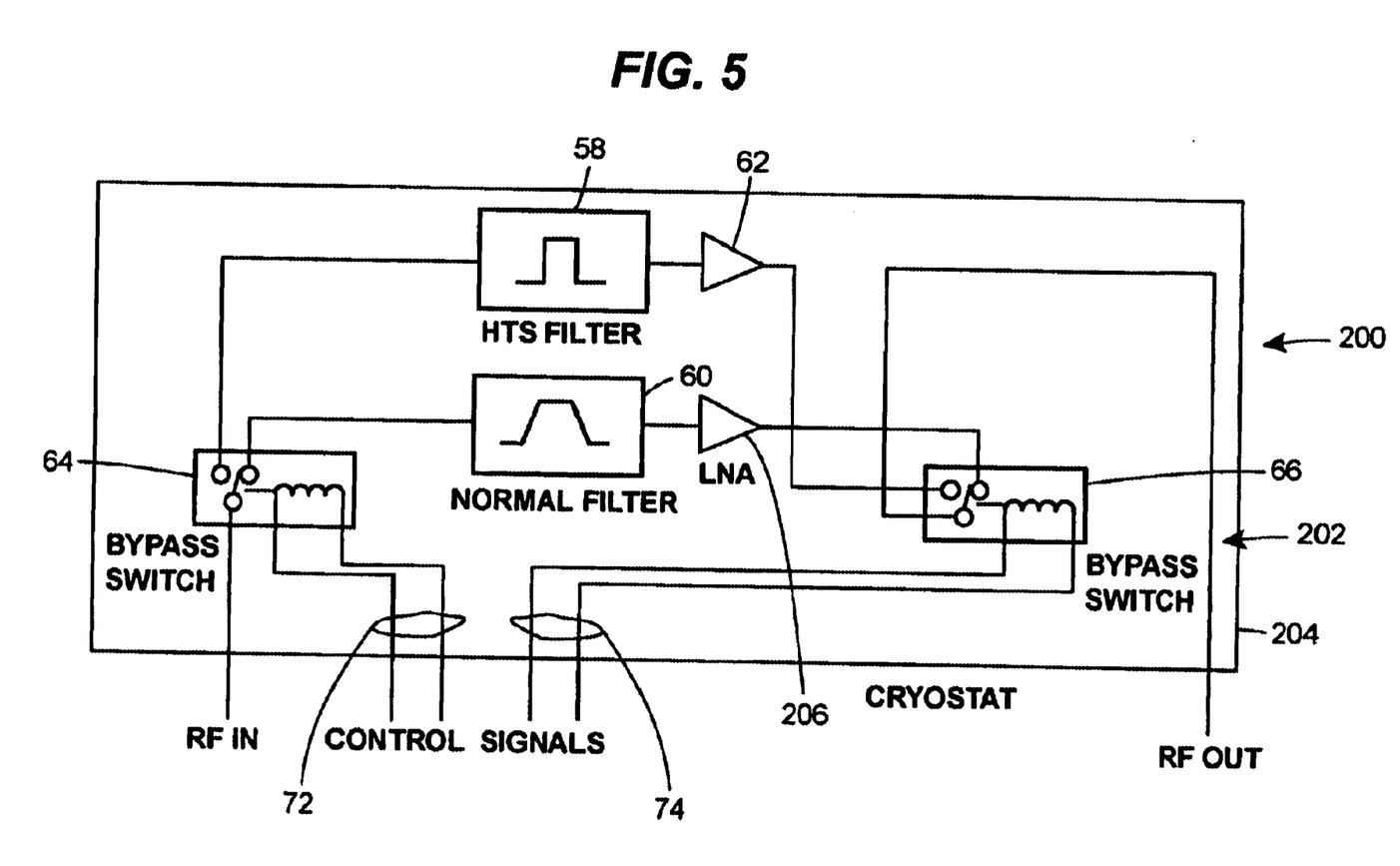
FIG. 5 is a block diagram of a receiver front-end in accordance with a fourth embodiment of the present invention.

With regard to FIG. 5, a receiver front-end 200 in accordance with another embodiment of the present invention is similar in certain respects to the embodiments shown in FIGS. 2 and 4, inasmuch as all of the components in both the HTS and bypass paths are disposed in a cold region of a chamber 202 of a cryostat 204 (as in FIG. 2) and an additional low-noise amplifier 206 is utilized in the bypass path (as in FIG. 4).

Figure 6:
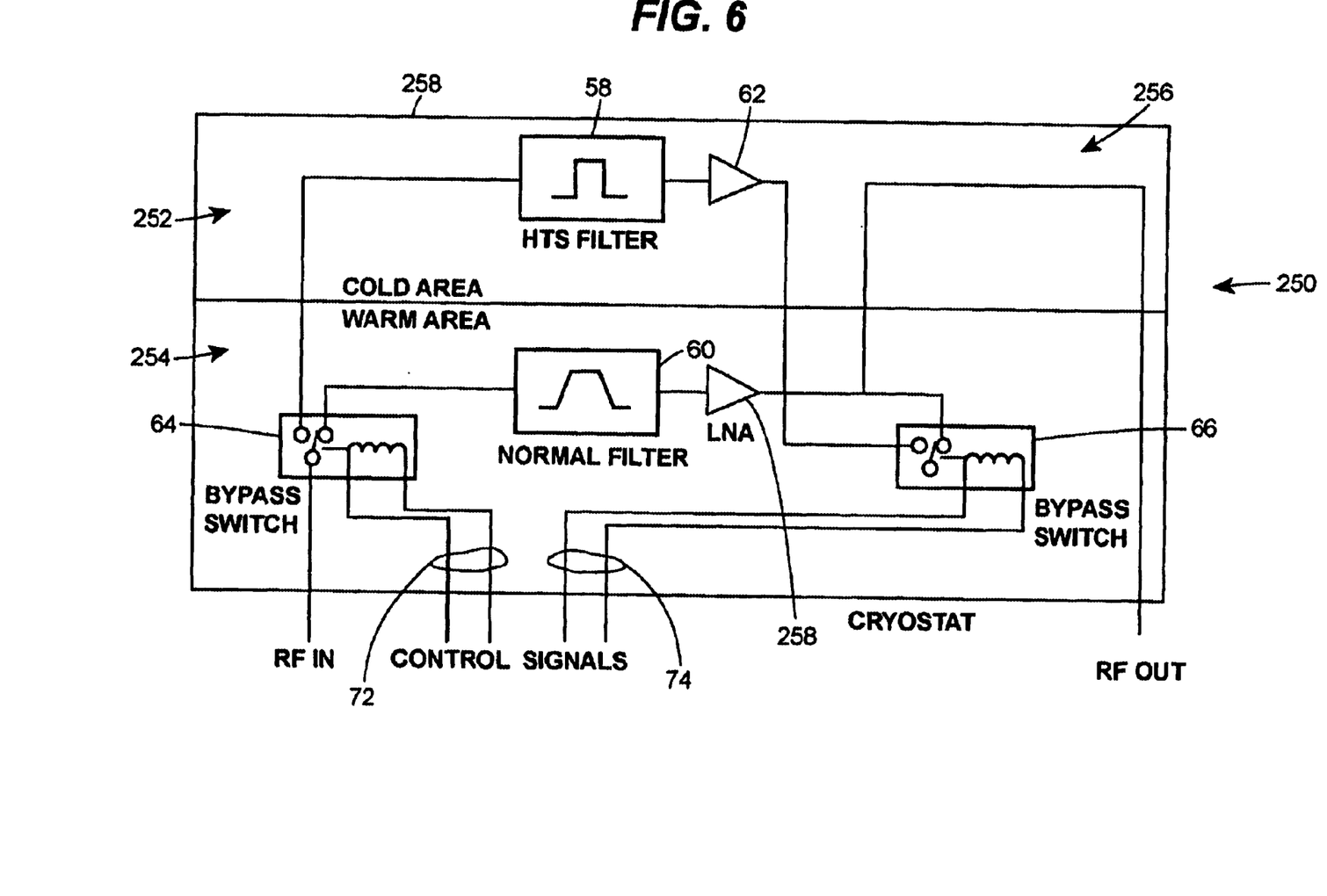
FIG. 6 is a block diagram of a receiver front-end in accordance with a fifth embodiment of the present invention.

With regard to FIG. 6, another embodiment of the present invention is shown in connection with a receiver front-end 250 is similar in certain respects to the embodiments shown in FIGS. 3 and 4, inasmuch as the components of the HTS path and the components of the bypass path are separated into a cold region 252 and a warm region 254 of a chamber 256 of a cryostat 258 (as in FIG. 3) and an additional low-noise amplifier 258 is utilized in the bypass path (as in FIG. 4).

In each of the embodiments shown in FIGS. 4–6, the bypass switch 66 includes a pair of input terminals coupled to the low-noise amplifiers disposed in the HTS and bypass paths, such that the state of the bypass switch 66 determines which signal will be provided to an output port of the receiver front-end.

It should be noted that in certain embodiments of the present invention, use of the conventional filter 60 may require compensation for operation at both cryostatic and normal ambient temperatures. That is, the conventional filter may de-tune due to dimensional changes in the filter structure brought about by the move from cryogenic temperatures to ambient temperatures. As is known to those skilled in the art, these changes can be compensated by filter design and the selection of materials with an appropriate thermal coefficient of expansion.

It should further be noted that the control signals carried by the lines 72 and 74 are transmitted with almost perfect insulation, inasmuch as the cryostat chamber may be substantially evacuated. As a result, the wires carrying the signals may not be so small in a diameter that they melt for lack of heat dissipation. Therefore, a tradeoff exists between the heat leaked to the cold region by the wires and the size necessary to prevent melting. Furthermore, these wires may be wrapped in insulative material, such as the aforementioned MLI, to prevent them from touching anything inside the cryostat chamber, which could result in an undesirable change in the heat gradient thereof to a non-uniform condition.

The communication signal processed by the receiver front-ends of the present invention is not limited to any particular type of RF signal, nor is it limited to any one type of wireless communication signal. Accordingly, practice of the present invention is well-suited for, but not limited to, PCS, cellular, and other wireless systems, and may be particularly well-suited for third generation (i.e., "3G") and other systems having a wide bandwidth, such as W-CDMA.

Although the receiver front-end configurations described hereinabove are particularly well suited for use with such wireless communication systems and are discussed in that context herein, persons of ordinary skill in the art will readily appreciate that the teachings of the invention are in no way limited to such an environment of use. On the contrary, receiver front-ends constructed pursuant to the teachings of the invention may be employed in any application which would benefit from the high performance filtering that it provides without departing from the scope or spirit of the invention.

The foregoing detailed description has been given for clearness of understanding only, and no unnecessary limitations should be understood therefrom, as modifications would be obvious to those skilled in the art.

What is claimed is:

1. An RF system, comprising:
    a cryostat having a chamber and a cold region in the chamber;
    a high-temperature superconducting filter disposed in the cold area;
    a low-noise amplifier disposed in the chamber;
    a bypass switch coupling the high-temperature superconducting filter to the low-noise amplifier; and
    a conventional filter coupled to the bypass switch.

2. The RF system of claim 1, wherein the low-noise amplifier is disposed in the cold region.

3. The RF system of claim 1, wherein the bypass switch is disposed in the chamber.

4. The RF system of claim 1, further comprising a further low-noise amplifier that couples the conventional filter to the bypass switch.

5. The RF system of claim 1, wherein:
    the chamber of the cryostat includes a warm region;
    the conventional filter is disposed in the warm region.

6. The RF system of claim 1, further comprising a further bypass switch coupled to the high-temperature superconducting filter and the conventional filter.

7. The RF system of claim 1, wherein the bypass switch comprises means for switching based on temperature.

8. The RF system of claim 1, wherein the bypass switch comprises a bi-metallic structure.

9. An RF system, comprising:
    a conventional filter;
    a first low-noise amplifier coupled to the conventional filter;
    a cryostat having a chamber and a cold region in the chamber;
    a high-temperature superconducting filter disposed in the cold region;
    a second low-noise amplifier disposed in the chamber and coupled to the high-temperature superconducting filter; and
    a bypass switch having a pair of input terminals coupled to the first and second low-noise amplifiers.

10. The RF system of claim 9, wherein the first low-noise amplifier is disposed in the chamber of the cryostat.

11. The RF system of claim 9, wherein the first low-noise amplifier is disposed in the cold region of the chamber.

12. The RF system of claim 9, wherein the bypass switch is disposed in the chamber.

13. The RF system of claim 9, wherein the bypass switch is disposed in the cold region of the chamber.

14. The RF system of claim 9, wherein:
    the chamber of the cryostat includes a warm region;
    the conventional filter is disposed in the warm region.

15. The RF system of claim 9, further comprising a further bypass switch coupled to the high-temperature superconducting filter and the conventional filter.

16. The RF system of claim 9, wherein the bypass switch comprises means for switching based on temperature.

17. The RF system of claim 9, wherein the bypass switch comprises a bi-metallic structure.

* * * * *

UNITED STATES PATENT AND TRADEMARK OFFICE
CERTIFICATE OF CORRECTION

PATENT NO. : 6,622,028 B1
DATED : September 16, 2003
INVENTOR(S) : Amr Abdelmonem et al.

It is certified that error appears in the above-identified patent and that said Letters Patent is hereby corrected as shown below:

<u>Title page,</u>
Item [75], Inventors, delete "Amr Abdelmonem, Arlington Heights, IL (US)" and insert -- Amr Abdelmonem, Arlington Heights, IL (Egypt) --.

Signed and Sealed this

Twentieth Day of January, 2004

JON W. DUDAS
*Acting Director of the United States Patent and Trademark Office*